Patented July 2, 1929.

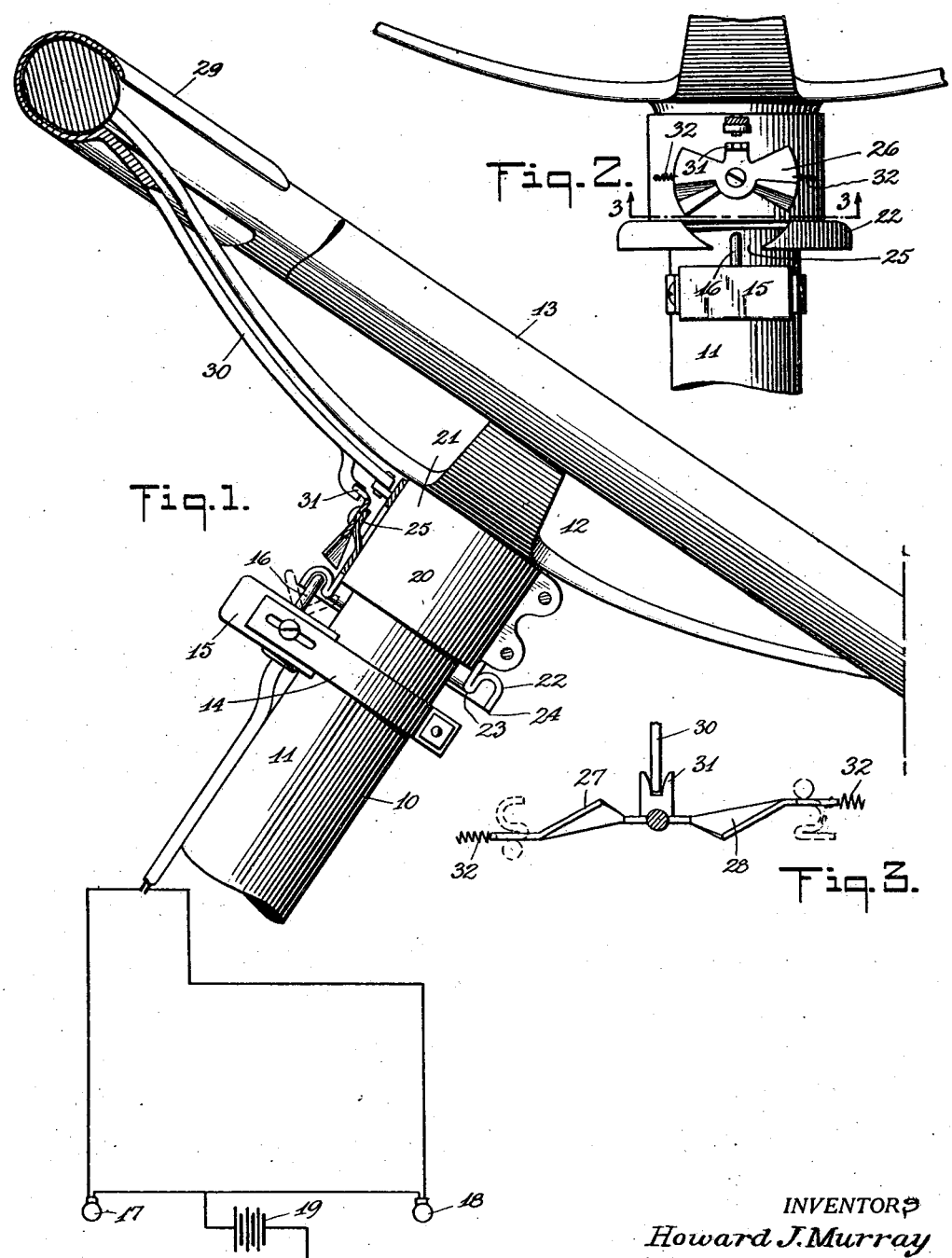

1,719,777

UNITED STATES PATENT OFFICE.

HOWARD J. MURRAY, OF BROOKLYN, NEW YORK, AND WALTER S. RUGG, OF PITTSBURGH, PENNSYLVANIA, ASSIGNORS TO R. M. COMPANY, INC., OF EAST PITTSBURGH, PENNSYLVANIA, A CORPORATION OF DELAWARE.

CIRCUIT CLOSER.

Application filed July 7, 1923. Serial No. 650,011.

The invention relates to a signalling device of the type commonly found on automotive vehicles for the purpose of indicating the intent of the operator to turn to the right or left. The present disclosure constitutes another physical embodiment of the form of the invention entitled "Direction indicator attachment" filed under even date and bearing Serial No. 650,010.

One of the objects of the invention is to provide a simple form of signal device which will tend to school the operator to give a pre-indication of his intent to cause some sequential action of the vehicle equipped with the device. Incidental to this general object another object is to provide a signal or indicator of the class descerbied which requires a positive actuation on the part of the operator in order to cause the proper signal to function.

Another object is to provide in connection with such signalling device, a safety device which will cause all signals to become inoperative and out of the control of the operator following any movement of the steering wheel to effect a turning of the vehicle to either the right or left.

The invention accordingly features a construction in which the signal device must be actuated by the operator prior to the actuation of the steering mechanism, which device will not become operative if an attempt be made to reverse this sequence of operation and will be restored into position to be operated only when the steering mechanism is again in its normal straight forward directing position.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a sectional view taken through the upper portion of a steering column showing a preferred embodiment of the invention installed thereon and showing in diagrammatic outlines a signalling system together with the necessary electrical connections;

Figure 2 is a view in front elevation of the control looking at the same from the left side of Figure 1; and Figure 3 is an enlarged detailed view of the butterfly cam shown in Figures 1 and 2 and taken on the line 3—3 of Figure 2.

In the following description and in the claims, parts will be identified by specific names for convenience of expression but they are intended to be as generic in their application to similar parts as the art will permit.

In the drawings there is shown a steering column 10 including a fixed casing 11 and a steering wheel 12 including the usual hand rim 13. Demountably positioned on the casing 11 by means of a strap 14 is a circuit closer 15. The circuit closer includes a spring controlled upstanding control lever 16 and is designed to be moved either to the right or left as indicated in dotted lines in Figure 1 so as to close the circuit through a left indicating signal 17 or a right indicating signal 18. The circuit is supplied with energy from a battery 19 and in other respects the device disclosed in this application corresponds in general to the disclosure in the above identified application filed under even date.

A split band 20 is secured to the hub 21 of the wheel and has its lower edge bent upwardly, outwardly and back upon itself to form a downwardly facing and split annular groove 22. This groove is so disposed that it can ride idly over the lever 16 when the lever is in its normal upstanding and circuit opening position shown in Figure 1. The lower edges 23 and 24 forming the groove are so disposed that when the lever is shifted by the cam mechanism hereinafter described the edges will act as stops to prevent the return to normal of the lever and will act to lock the lever in one or the other of its circuit closing positions until re-rotation of the steering wheel causes the lever to come opposite the opening 25 formed in the edges as shown more particularly in Fig. 2. A portion of the band 21, is split and bent outwardly to form an offset 25 and to this offset is pivoted a two-end cam 26, hereinafter identified as a butterfly cam. This cam is provided with outstanding wing portions 27 and 28 which are inclined in opposite directions from a tangent to the path described by the cam in rotating with the steering wheel. The cam faces 27 and 28 are so disposed that when the cam is rotated from its normal, inoperative position shown in Figure 2, one or the other of the cam faces will be disposed to extend through the opening 25 and into bearing engagement with the lever to move the same to the right or left depending upon the cam selected, to actuate the lever. The cam is operatively controlled from a handle or hand grip 29 guided for circumferential movement on the rim 13 and operatively connected through a lever 30. The inner end of the lever engages between bifurcated arms 31 formed in the out-turned upper end of the cam. A spring 32 acts on the cam to return the same to its inoperative position removed from possibility of engagement with the lever as more particularly shown in Figure 2.

In operation it will be understood that with the parts in their normal position shown in the drawings, the steering wheel can be actuated independently of the signalling device. Should the operator desire to make a turn, such for instance, as a turn to the left, he will first move the grip 29 in the direction in which he intends to turn. If this be a movement to the left, as suggested, then the cam 27 will first be shifted into position facing the upstanding lever 16 and a continued movement of the grip 29 will cause the cam to bear on the lever to shift the same to the left and thus close the circuit through the left hand signal 17. Ordinarily the operator will move the grip in the reversed direction to intercept the actuation of the signal and this can be done provided the steering mechanism is in normal position to cause the vehicle to travel straight forward. It is obviously within the scope of this disclosure to make the spring 32 sufficiently strong to return the parts to their normal inoperative position when the operator releases his holding tension on the grip 29. Instead of shifting the selected cam into bearing engagement with the lever 16 it is possible to shift the cam into position facing the lever touching but not moving the same and to depend upon the turning of the steering wheel itself to actually shift the lever. In this way the proper signal may be pre-selected but not actuated until the steering movement has actually commenced. In this respect the disclosure follows the invention disclosed in the preceding applications.

It is a feature of this disclosure that the cam must be rotated into position prior to the shifting of the steering wheel. Should the steering wheel be turned the locking groove 22 will move over the lever 16 thus locking the same in its normal inoperative position and no movement of the cam thereafter, and while the wheel is so shifted, will have any effect on the locked circuit closer. The locking of the signal device will have no effect on the steering mechanism and the steering wheel can be shifted at all times independent of the signal device. However, in order to actuate the signal the steering wheel must be restored to its normal position and thus permit the lever to come opposite the opening between the ends of the part forming the groove.

In such a device it is necessary for the operator to actuate the signal prior to any steering movement for if he moves the steering wheel prior to giving the signal then the signal control will be locked against any movement and will remain locked until the steering wheel is restored to its position to cause a forward drive of the vehicle.

By means of a device of this character, the operator is schooled to give a pre-indication of his intended turn and soon learns that the actuation of the signal must precede the actual turning of the vehicle.

While emphasis has been placed on the feature of a signal device for indicating a left or right turn of the vehicle it is obviously within the scope of the disclosure to use the control herein featured for other signal devices, such for instance, as a "stop" signal and as a matter of fact the disclosure can be used in any situation where a definite sequence of overt acts on the part of an operator is desired.

While we have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described our invention, we claim:

1. In a device of the class described, the combination of a steering wheel, a control lever, manually actuated mechanism carried by the steering wheel, said mechanism including a butterfly cam adapted to be operatively connected to the lever to shift the same into position to cause the lever to be moved into an operative position and locking means rotated by the steering wheel for securing the control lever in the operative position into which it has previously been moved by the manual actuation of the cam.

2. In a device of the class described, the combination of a circuit closer including a control lever movable in opposite directions, a butterfly cam mounted for rotary movement and including oppositely disposed inclined wings each adapted to be moved into bearing engagement to shift the lever in one or the other of its shiftable directions depending on the wing in engagement therewith and a spring acting on the cam and tending normally to move the same into an inoperative position relative to the lever.

3. In a device of the class described, the combination with a steering wheel provided with a rim, of an attachment therefor comprising a manually actuated grip member mounted to move along the rim of the wheel, a switch control member mounted to move idly when the wheel is rotated and moved by the sliding of the grip member on the rim into position to become operative on the subsequent movement of the wheel.

4. In a device of the class described, the combination with a steering wheel provided with a rim, a lever terminating at one end into a hand grip movable along the rim in the direction of movement of the same, and a switch actuating cam pivoted to the wheel to turn therewith and controlled by the lever.

5. In a device of the class described, the combination with a steering wheel provided with a rim, a lever terminating at one end into a hand grip movable along the rim in the direction of movement of the same, a switch actuating cam pivoted to the wheel to turn therewith and controlled by the lever, and a resilient means acting on the cam and tending normally to maintain the same in inoperative position.

6. In a device of the class described, the combination of a control device provided with a lever having an operative and an inoperative position, steering mechanism including a lever locking member spaced from and thus disconnected from the lever when the steering mechanism is in its normal forward driving position and movable idly past the lever when the lever is in its inoperative position and movable on the rotation of the steering mechanism from its normal position into position locking the lever in its operative position and manually actuated means, operably dependent upon the normal position of the steering mechanism for shifting the lever from its inoperative into its operation position to be locked therein on a subsequent movement from normal of the steering mechanism.

7. In a device of the class described, the combination of a steering mechanism, a lever locking member mounted on the steering mechanism to turn therewith, a control lever having two positions, one in the path of movement of said locking member and the other offset from said path, and manually actuated means for shifting the lever transversely of said path to and from its two positions and said locking means acting to prevent the shifting of said control lever when shifted by the steering mechanism into the path of transverse movement of the lever.

8. In a device of the class described, the combination of a steering wheel, a lever shifting cam carried by the wheel and movable therewith, a lever disposed in the path of movement of the cam and means for disposing the cam in operative position in said path, and resilient means acting on the cam and normally tending to move the same into an inoperative position out of said path.

9. In a vehicle, the combination with a steering wheel including a rim, of a circuit closer provided with means for securing the same in place, an attachment provided with means for remountably securing the same in place, said attachment constituting a control for the circuit closer and including an actuating handle partially encircling and guided on the rim of the steering wheel.

10. In a device of the class described, an attachment provided with means for securing the same to a vehicle without modifying the vehicle parts to which it is secured, said attachment including vehicle mechanism and a control therefor, and said control provided with means curved to the curvature of the wheel rim and shaped for mounting the same in position to constitute in effect the part of the steering wheel rim which is usually grasped by the operator in the act of steering the vehicle.

11. In a device of the class described, the combination of a vehicle steering wheel provided with a rim, and a manually actuated control including a curved hand grip member mounted to move circumferentially of the rim.

This specification signed this 20 day of June, 1923.

HOWARD J. MURRAY.

This specification signed this 20 day of June, 1923.

WALTER S. RUGG.